(12) United States Patent
Li et al.

(10) Patent No.: US 10,944,873 B2
(45) Date of Patent: Mar. 9, 2021

(54) ROUTING VOIP TRAFFIC

(71) Applicant: Comcast Cable Communications, LLC, Philadelphia, PA (US)

(72) Inventors: Chia-Chang Li, Holmdel, NJ (US); Eric Wong, Edison, NJ (US); Vengatarajulu Rajasekar, Mount Laurel, NJ (US); Satish Sampangiramiah, Highlands Ranch, CO (US)

(73) Assignee: Comcast Cable Communications, FFC, Philadelphia, PA (US)

( * ) Notice: Subject to any disclaimer, the term of this patent is extended or adjusted under 35 U.S.C. 154(b) by 0 days.

(21) Appl. No.: 15/783,766

(22) Filed: Oct. 13, 2017

(65) Prior Publication Data

US 2019/0116268 A1 Apr. 18, 2019

(51) Int. Cl.
*H04M 7/00* (2006.01)
*H04L 29/06* (2006.01)

(52) U.S. Cl.
CPC ...... *H04M 7/0075* (2013.01); *H04L 65/1006* (2013.01); *H04L 65/1016* (2013.01); *H04L 65/1069* (2013.01)

(58) Field of Classification Search
CPC .................. H04M 7/0075; H04L 65/1006
See application file for complete search history.

(56) References Cited

U.S. PATENT DOCUMENTS

| | | | | |
|---|---|---|---|---|
| 6,614,781 B1* | 9/2003 | Elliott | ................. | H04L 12/6418 370/352 |
| 8,547,964 B2* | 10/2013 | DeConcilis | .............. | H04Q 3/66 370/352 |
| 2007/0061397 A1* | 3/2007 | Gregorat | ............. | H04L 29/1216 709/203 |
| 2007/0263633 A1* | 11/2007 | He | .......... | H04L 12/56 370/395.2 |
| 2008/0159261 A1* | 7/2008 | Bessis | ..................... | H04L 12/66 370/352 |
| 2008/0175362 A1* | 7/2008 | Bangor | ................. | H04M 15/00 379/114.01 |
| 2008/0205382 A1* | 8/2008 | Heap | ....................... | H04L 45/00 370/352 |
| 2009/0003574 A1* | 1/2009 | Schneider | ......... | H04L 29/06027 379/201.12 |
| 2009/0074173 A1* | 3/2009 | Davis | ...................... | H04Q 3/66 379/221.13 |

(Continued)

OTHER PUBLICATIONS

Wikipedia contributors, "Voice over IP," Wikipedia, The Free Encyclopedia, pp. 1-17, https://en.wikipedia.org/w/index.php?title=Voice_over_IP&oldid=819794442 (accessed Jan. 16, 2018).

(Continued)

*Primary Examiner* — Mohammad S Anwar
(74) *Attorney, Agent, or Firm* — Banner & Witcoff, Ltd.

(57) ABSTRACT

Methods and systems for routing voice over internet protocol (VOIP) are described. A service provider may provide a VOIP infrastructure for routing VOIP calls. One or more other service providers may join the VOIP infrastructure. A computing device may identify the service provider servicing the VOIP calls and may further process the calls accordingly.

20 Claims, 7 Drawing Sheets

(56) References Cited

U.S. PATENT DOCUMENTS

| | | | | |
|---|---|---|---|---|
| 2012/0106727 A1* | 5/2012 | Kaushal | ................ | H04L 65/00 |
| | | | | 379/211.01 |
| 2012/0129503 A1 | 5/2012 | Lindeman et al. | | |
| 2013/0212298 A1* | 8/2013 | Bunch | ................ | H04L 45/42 |
| | | | | 709/244 |
| 2015/0350075 A1* | 12/2015 | Li | ................ | H04L 45/745 |
| | | | | 709/224 |

OTHER PUBLICATIONS

Robert Valdes & Dave Roos, "How VoIP Works" May 9, 2001. How StuffWorks Online Newsletter, pp. 1-3 HowStuffWorks.com. <https://computerhowstuffworks.com/ip-telephony.htm> Jan. 16, 2018.
Wikipedia contributors, "Session Initiation Protocol," Wikipedia, The Free Encyclopedia, pp. 1-9, https://en.wikipedia.org/W/index.php?title=Session_initiation_Protocol&oldid=819293574 (accessed Jan. 16, 2018).

* cited by examiner

Service Provider Determination Table

| Ingress Trunk Name | Calling Party Domain Name | Organization Header | Service Provider Identifier |
|---|---|---|---|
| (Blank) | (Blank) | (Blank) | Internal Service Provider |
| (Blank) | Ims.Internal.net | (Blank) | Internal Service Provider |
| Session Border Controller 1 | Ims.Internal.net | (Blank) | Internal Service Provider |
| Session Border Controller 1 | Ims.ServiceProviderA.net | (Blank) | Service Provider A |
| (Blank) | IP Address for Service Provider A | (Blank) | Service Provider A |
| (Blank) | (Blank) | Service Provider B | Service Provider B |
| Session Border Controller 2 | (Blank) | (Blank) | Service Provider B, Routing Preference 1 |
| (Blank) | NonIMS.ServiceProviderB.RoutingPreference1.net | Service Provider B | Service Provider B, Routing Preference 1 |
| Session Border Controller 3 | (Blank) | (Blank) | Service Provider B, Routing Preference 2 |
| Session Border Controller 4 | (Blank) | (Blank) | Service Provider D |

FIG. 3

Routing Preference Database for Service Provider B, Routing Preference 1

| | VOIP Call Type | Routing Behavior |
|---|---|---|
| 705 | | |
| 710 | Local Call | Local Provider |
| 715 | Emergency Call | Emergency Service Provider |
| 720 | Help Desk Call | Service Provider B Help Desk |
| 725 | Business Class VOIP Call | Service Provider B Business Class Session Border Controller |
| 730 | International VOIP Call to England | International Provider |

ROUTING VOIP TRAFFIC

BACKGROUND

Voice calls may be performed over internet protocol (IP) networks using voice over internet protocol (VOIP) technology. However, building the infrastructure to support VOIP services may be extensive, and many service providers may instead seek access to pre-existing VOIP infrastructure in order to provide the service to their subscribers. But, each service provider may provide routing data for their voice calls that may be incompatible with other service provider's routing data.

SUMMARY

The following summary is for illustrative purposes only, and is not intended to limit or constrain the detailed description. The following summary merely presents various described aspects in a simplified form as a prelude to the more detailed description provided below.

Service providers may seek to use a VOIP infrastructure to handle their VOIP calls. However, each service provider may require different routing preferences or routing rules for their VOIP calls. Thus, a routing server may need to identify a service provider servicing the call and may need to further determine routing preferences for the call. Additionally, new service providers may seek to join the VOIP infrastructure. The new service providers may set up their own routing preferences, such as routing rules, for their subscribers. The routing preferences may be added and stored in a routing preference database. The routing server may use the routing preference database to route VOIP calls to their destinations.

BRIEF DESCRIPTION OF THE DRAWINGS

These and other features, aspects, and advantages of the present disclosure will become better understood with regard to the following description, claims, and drawings. The present disclosure is illustrated by way of example, and is not limited by, the accompanying figures in which like numerals indicate similar elements.

FIG. 3 shows an example service provider determination table according to one or more aspects described herein.

FIG. 5 shows an example routing preference database according to one or more aspects described herein.

DETAILED DESCRIPTION

Figure 1:
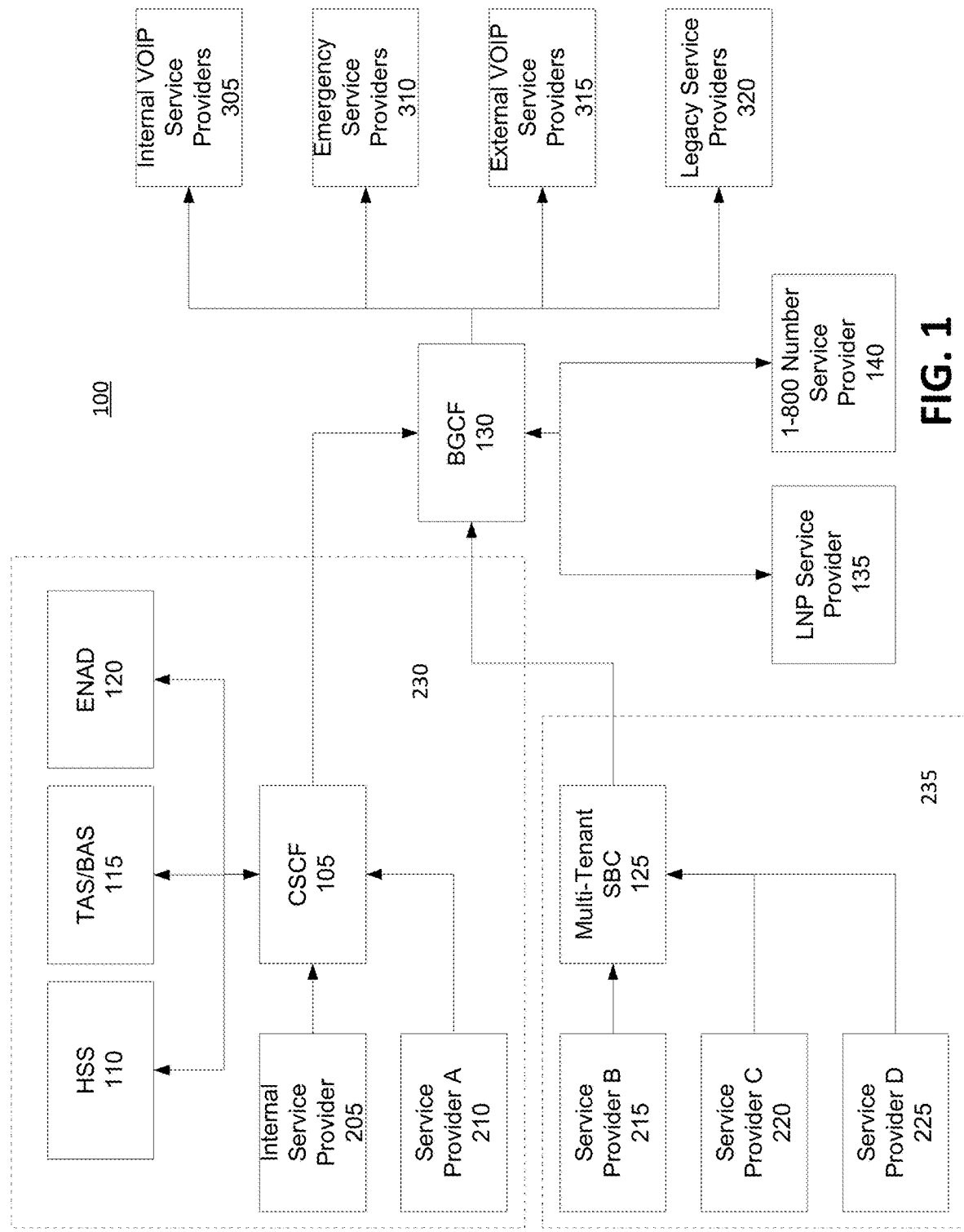
FIG. 1 shows an example voice over internet protocol routing infrastructure that may be used to implement one or more aspects described herein.

In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure. In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure.

Aspects described herein relate to routing voice over internet protocol (VOIP) calls over a VOIP infrastructure. For example, a service provider may use a VOIP routing infrastructure to route a VOIP call from a caller to a recipient. From the caller's perspective, making a phone call and a VOIP call may be similar. For instance, a caller may input a phone number on a caller user device. The recipient may answer and a line of communication, between the caller and the recipient, may be established.

However, while the caller might not notice a difference between establishing a phone call and a VOIP call, the infrastructure required for establishing a VOIP call may be different from the infrastructure for establishing a phone call. For example, existing phone systems may use a circuit switching method, which establishes a circuit when the recipient answers the phone call. The circuit may be continuously open between the caller's user device and the recipient's user device regardless if either party is speaking. However, maintaining a continuously open circuit may require excessive amounts of bandwidth. Therefore, rather than using the circuit switching method, VOIP calls may use a packet switching method, which may be similar to the packet switching method for requesting web pages. To request a new web page, a user device may encode and transmit a data packet via an internet protocol (IP) network. The IP network may forward the request to a web application server. The web application server may process the request and transmit information indicating the web page back to the user device. Thus, rather than establishing a continuous circuit between the user device and the web application server, the user device may transmit and receive data packets when the user requests a new web page.

For VOIP calls using the packet switching method, when a caller speaks, a caller user device may encode and transmit a data packet via the IP network. The IP network may forward the request to a VOIP infrastructure. But, rather than transmitting information back to the caller user device, the data packet may be forwarded to a recipient user device. To forward the data packet to the intended recipient user device, the VOIP infrastructure may determine a route from the caller user device to the recipient user device.

FIG. 1 shows an example VOIP routing infrastructure 100 that may be used to route VOIP calls as described above. As shown on FIG. 1, an enterprise organization may provide a VOIP routing infrastructure, such as VOIP routing infrastructure 100, for processing VOIP calls. Additionally, a service provider for the enterprise organization, such as an internal service provider 205, may operate a VOIP infrastructure 100 to process and/or route the VOIP calls between user devices. The service provider may be an entity that provides telecommunication services to subscribers. For example, the service provider may provide VOIP services to their subscribers.

The internal service provider 205 may use the VOIP infrastructure 100 to process and/or route VOIP calls for subscribers of their VOIP network. Further, providing a VOIP infrastructure may be difficult, and some enterprise organizations may seek to join and use an existing VOIP infrastructure, such as the VOIP infrastructure 100, rather than providing their own. As such, some service providers for these enterprise organizations, such as external service providers, may also use the VOIP infrastructure 100 to route their VOIP calls. For example, external service providers, such as a service provider A 210, a service provider B 215, a service provider C 220, and a service provider D 225, may join a pre-existing VOIP infrastructure, such as the VOIP infrastructure 100 offered by the internal service provider 205.

In VOIP routing infrastructure 100, the internal service provider 205 may provide an architectural framework, such as an IP multimedia subsystem (IMS) framework 230, to deliver their VOIP service to their subscribers. For example, the caller user device, the VOIP infrastructure, and the recipient user device may use the framework and/or a protocol to encode, decode, receive, and/or transmit the VOIP data packets. In some examples, the internal service provider 205 may use the framework, such as the IMS framework 230, to perform and/or execute their VOIP service. The IMS 230 may receive, encode, decode, and/or transmit the VOIP data packets using an internet protocol, such as a session initiation protocol (SIP). Additionally, an external service provider or a tenant, such as the service provider A 210, may also use the IMS 230 and/or the SIP to deliver their VOIP service to their subscribers.

The IMS architectural framework 230 may include a call session control function (CSCF) router 105 that may process the VOIP call. For example, a user, such as a subscriber of the internal service provider 205 and/or the service provider A 210, may request for a VOIP call with another user. The CSCF router 105 may receive the VOIP call request, process the VOIP call request, and transmit the VOIP call request to a breakout gateway control function (BGCF) 130. The CSCF router 105 may be in communication with a home subscriber server (HSS) 110, a telephone application server (TAS) and a business application server (BAS) 115, and/or an extended number association database (ENAD) 120. The HSS 110 may be a user database or registry that stores subscriber data. For example, the HSS 110 may store subscriber data for the internal service provider 205 and/or one or more external service providers, such as the service provider A 210. The CSCF router 105 may use the HSS 110 to determine a subscriber initiating the VOIP call and/or a subscriber receiving the VOIP call. The TAS and BAS 115 may be application servers that host and/or execute VOIP services. The ENAD 120 may be a routing database that determines whether a VOIP call remains in the IMS infrastructure. Additionally, and/or alternatively, the ENAD 120 may be an extended E. 164 Number to URI Mapping (ENUM) server.

In some examples, a service provider may use a non-IMS architectural framework 235 to deliver their VOIP service. For example, some external service providers that join an internal service provider's VOIP infrastructure 100, such as the service provider B 215, the service provider C 220, and/or the service provider D 225, may use a non-IMS framework 235 to process their VOIP calls. The non-IMS framework 235 may include a multi-tenant session border controller (SBC) 125 to process the VOIP calls. For example, a user, such as a subscriber of the service provider B 215, the service provider C 220, and/or the service provider D 225, may request a VOIP call with another user. The multi-tenant SBC 125 may receive the VOIP call request, process the VOIP call request, and transmit the VOIP call request to the BGCF 130. In some examples, the multi-tenant SBC 125 may process VOIP calls for one or more service providers. For example, the multi-tenant SBC 125 may process VOIP calls for the service provider B 215, the service provider C 220, and/or the service provider D 225. In some examples, the multi-tenant SBC 125 may include multiple different SBCs. For example, the service provider B 215 may use a first SBC for their VOIP calls, the service provider C 220 may use a second SBC for their VOIP calls, and the service provider D 225 may use a third SBC for their VOIP calls.

Since the VOIP infrastructure 100 may include many different architectural frameworks, such as the IMS framework 230 and/or the non-IMS framework 235, a centralized computing platform, such as the BGCF 130, may standardize the VOIP call requests to determine the route to the recipient user device. For example, the BGCF 130 may receive VOIP call requests from the CSCF 105 and/or the multi-tenant SBC 125. The BGCF 130 may then communicate with a local number portability (LNP) service provider 135 and/or a 1-800 number service provider 140 to identify a destination for the VOIP call, such as a recipient user device. For instance, the LNP service provider 135 may include a number portability administration center (NPAC) feed that may provide a database for phone numbers corresponding to recipient's user devices. The BGCF 130 may identify the recipient user device from the VOIP call request by communicating with the LNP service provider 135. Further, the 1-800 number service provider 140 may provide a database for 1-800 numbers. The BGCF 130 may identify the recipient user device from the VOIP call request by communicating with the 1-800 number service provider 140.

The BGCF 130 may determine a route for the VOIP call. For example, the route may include the caller user device, the recipient user device, and one or more servers, computing devices, and/or session border controllers (SBC). Each server, computing device, and/or SBC may forward the VOIP call request to another server, computing device, and/or SBC until the request reaches the recipient user device. In some examples, the BGCF 130 may route the VOIP calls to an appropriate destination, such as to internal VOIP service providers 305. The internal VOIP service providers 305 may include one or more computing devices, servers, and/or SBCs that provide services for the internal service provider 205. For example, the services may include an internal conference call service, an internal voicemail service, an internal enterprise network, and/or a business class VOIP service. The BGCF 130 may determine the route and forward the VOIP call request to the internal VOIP service providers 305. The internal VOIP service providers 305 may process the VOIP call and deliver the call request to the recipient user device.

In some examples, the BGCF 130 may route the VOIP call to another appropriate destination, such as emergency service providers 310, external VOIP service providers 315, and/or legacy service providers 320. The emergency service providers 310 may include servers and/or computing platforms to process 911 distress VOIP calls. The external VOIP service providers 315 may include peering SBCs managed by external service providers, such as the service provider A 210, the service provider B 215, the service provider C 220, and/or the service provider D 225. The legacy service providers 320 may include legacy equipment, such as a media gateway control function, a co-management server, a SIP router proxy, and/or an interconnect border gateway function, to process the VOIP calls.

The elements of FIG. 1, such as the BGCF 130, have been shown as individual blocks. However, additionally, and/or alternatively, some elements may be combined, logically distinct, or implemented within a cloud computing platform. For example, some elements, such as the BGCF 130 and the CSCF 105, may be combined into one computing platform. The combined computing platform may perform the functions of both elements, such as functions of both the BGCF 130 and the CSCF 105. Additionally, and/or alternatively, some elements, such as the IMS architectural framework 230 and the BGCF 130, may be implemented in a cloud computing platform.

Figure 2:
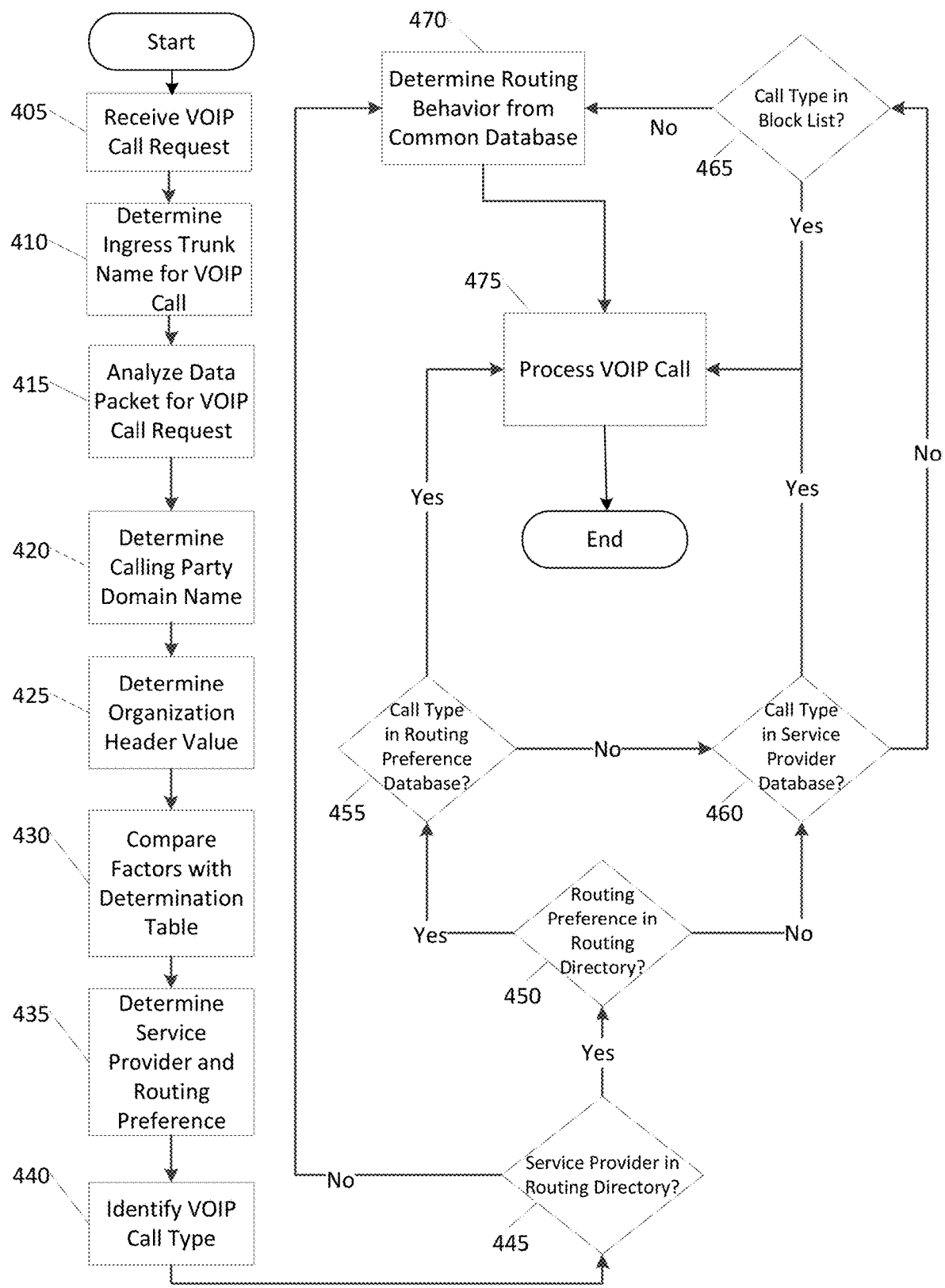
FIG. 2 shows an example method for determining routing preferences for a voice over internet protocol call according to one or more aspects described herein.

FIG. 2 shows an example method for determining routing preferences for a VOIP call using the VOIP infrastructure 100. At step 405, the BGCF 130, may receive a VOIP call request. For example, a user may initiate a VOIP call by inputting a phone number on a caller user device. The user may be a subscriber of a service provider in the VOIP infrastructure 100 of FIG. 1, such as the internal service provider 205, the service provider A 210, the service provider B 215, the service provider C 220, or the service provider D 225. As mentioned above, service providers using an IMS architectural framework 230 may forward their VOIP call request to the CSCF 105. Further, service providers using a non-IMS architectural framework 235 may forward their VOIP call request to the multi-tenant SBC 125. Regardless of the service provider and/or the architectural framework, the BGCF 130 may receive the VOIP call request.

The BGCF 130 may process the VOIP call and determine a route from the caller user device to the recipient user device. However, each service provider may route their VOIP calls differently. For instance, a subscriber of the service provider A 210 may experience technical issues with service provider A's phone service. Thus, the subscriber may use a VOIP call to contact the help desk for the service provider A 210. But, the VOIP infrastructure 100 may include many different service providers, and a VOIP call to the help desk for the internal service provider 205 might not solve the subscriber's issue. Thus, the service provider A 210 may route their VOIP help desk calls different from how the internal service provider 205 routes their VOIP calls. Additionally, and/or alternatively, some service providers may permit and/or block VOIP calls to certain destinations and/or recipients. For example, the service provider A 210 may block VOIP calls to an international destination, such as England, but may permit VOIP calls to another international destination, such as France. The service provider B 215, on the other hand, may block VOIP calls to Germany, but may permit VOIP calls from England.

Therefore, each service provider may provide different routing behaviors, such as different routing rules, depending on the VOIP call type (e.g., international VOIP calls or help desk calls). For example, the routing behavior for the service provider B 215 may block VOIP calls to Germany and permit VOIP calls to England. Thus, before determining a route to the recipient user device, the BGCF 130 may need to identify the service provider servicing the VOIP call, the routing behavior for the VOIP call, and the VOIP call type.

FIG. 3 shows an example service provider determination table, which may be discussed in relation to steps 410 through 435 of FIG. 2. For example, the BGCF 130 may identify the service provider servicing the VOIP call using a service provider determination table. Row 505 may show factors, such as an ingress trunk name, a calling party domain name, and/or an organization header value, that may be used to identify the service provider servicing the VOIP call. At steps 410 through 435 of FIG. 2, the BGCF 130 may determine these factors, and may then use the service provider determination table to identify the service provider.

At step 410, the BGCF 130 may determine an ingress trunk name for the VOIP call. The ingress trunk name may be the name of a previous server, computing device, and/or SBC that forwarded the VOIP call request to the BGCF 130. For example, the CSCF 105 may be an ingress trunk name for VOIP call requests from the internal service provider 205 and/or the service provider A 210. Further, in some examples, the name of the multi-tenant SBC 125 may indicate an ingress trunk name for the service provider B 215, the service provider C 220, and/or the service provider D 225.

In some examples, however, the multi-tenant SBC 125 may include multiple different SBCs. For example, referring to row 555 of FIG. 3, the session border controller 4 may be the ingress trunk for the service provider D 225. Referring now to row 540 and 545, two different session border controllers, such as session border controller 2 and session border controller 3, may be the ingress trunk for a single service provider, such as the service provider B 215. In some examples, a service provider, such as the service provider B 215, may include different routing preferences (e.g., instructions on how to route VOIP calls) for different subscribers, such as residential subscribers and business class subscribers. Each of the routing preferences may indicate different routing behaviors for the VOIP call types. Referring to row 540 and 550, the different ingress trunks, such as session border controller 2 and session border controller 3, may indicate different routing preferences. For example, session border controller 2 may relate to a first routing preference and session border controller 3 may relate to a second routing preference. Further, in some examples, such as in rows 520 and 525, the same session border controller may be the ingress trunk for two different service providers. For example, session border controller 1 may be the ingress trunk for the internal service provider 205 and the service provider A 210. Therefore, the BGCF 130 may use other factors, such as the calling domain name and/or the organization header, in addition to the ingress trunk, to identify the service provider.

At step 415, the BGCF 130 may analyze a data packet for the VOIP call request. As mentioned previously, the VOIP infrastructure 100 may use an internet protocol, such as a SIP, to encode, decode, receive, and/or transmit VOIP data packets. For example, the caller user device may encode one or more data packets indicating the VOIP call request, and may transmit the one or more data packets to the VOIP infrastructure 100. The BGCF 130 may use the one or more data packets, such as a SIP invite message, to determine the calling domain name and/or the organization header.

In some examples, the one or more data packets indicating the VOIP call request may be a SIP invite message. The BGCF 130 may use the SIP invite message to set up the VOIP call between the caller and the recipient. Further, the BGCF 130 may identify a service provider from the SIP invite message. For example, the header of the SIP invite message may include a VIA header, a FROM header, a TO header, an organization header, a diversion header, and/or a P-Asserted-Identity header. The VIA header may be a header that records the route taken by the SIP invite message. For example, when the BGCF 130 receives the SIP invite message, the VIA header may indicate a route, including the computing devices, servers, and/or SBCs, from the caller user device to the BGCF 130. The FROM header may indicate the caller user device that initiated the VOIP call.

The TO header may indicate the intended recipient user device for the VOIP call. The organization header may indicate an organization, such as a service provider, that is servicing the VOIP call. The diversion header may indicate a diversion from the intended recipient user device to another recipient user device. For example, the caller user device may initiate a VOIP call to the intended recipient user device. However, the intended recipient user device may forward their VOIP calls to another recipient user device. Depending on the diversion header, the BGCF 130 may divert the VOIP call from the intended recipient user device to another recipient user device. The P-Asserted-Identity header may indicate an identity of a user sending the SIP invite message.

At step 420, the BGCF 130 may determine a calling party domain name for the VOIP call request. The calling party domain name may be a domain name for the service provider. For instance, referring to row 515 and 520, the calling party domain name for the internal service provider 205 may be "Ims.Internal.net." The first part of the calling party domain name may be the architectural framework of the service provider, such as IMS 230 or non-IMS 235. Further, the second part of the calling party domain name may be an identified service provider, such as the internal service provider 205. Referring to row 540, the calling party domain name may also be an IP address for a service provider, such as the IP address for the service provider A 210.

The BGCF 130 may determine a calling party domain name from the one or more header values in the SIP invite message. In some examples, a service provider may insert a calling party domain name in the VIA header, the FROM header, the TO header, the diversion header, and/or the P-Asserted-Identity header. For example, the service provider may input a command for one or more computing devices, such as the CSCF 105, the multi-tenant SBC 125, and/or the caller user device, in the route from the caller user device to the BGCF 130 to insert the calling party domain name in the header of the SIP invite message. Additionally, and/or alternatively, in some examples, the BGCF 130 may determine the calling party domain name from header fields indicating route, the caller user device, and/or the recipient user device. For example, the header values may indicate a route (e.g., VIA header), a caller and/or a caller user device (e.g., FROM header, P-Asserted-Identity header), and/or a recipient user device (e.g., TO header, diversion header). The route, caller user device, and/or recipient user device may correspond to a particular service provider. For instance, service provider A's route, caller user device, and/or recipient user device may be different from service provider B's route, caller user device, and/or recipient user device. From these differences, in some examples, the BGCF 130 may determine the calling party domain name.

At step 425, the BGCF 130 may determine an organization header value. As mentioned previously at step 415, the SIP invite message may include a header indicating the organization header value. The BGCF 130 may determine the organization header value. For example, referring to FIG. 3, rows 535 and 545 may indicate organization header values, such as "service provider B."

At step 430, the BGCF 130 may compare the factors, such as the ingress trunk name, the calling party domain name, and/or the organization header value, with the service provider determination table, such as the example shown in FIG. 3. For example, as mentioned above, the BGCF 130 may determine the ingress trunk name, the calling party domain name, and/or the organization header value of the VOIP call request. Referring to FIG. 3, the BGCF 130 may compare these determined factors with the factors listed in the service provider determination table. Multiple different factors may be mapped to a single service provider, such as in rows 520 and 525. Additionally, and/or alternatively, the factors may indicate a same service provider, but different routing preferences, such as in rows 535 through 555. For example, the service provider B 215 may provide one or more routing preferences for their subscribers, such as a business class routing preference and a residential class routing preference. The BGCF 130 may use the factors, such as the ingress trunk name, the organization header value, and/or the calling party domain name, to identify the service provider and the routing preferences. For instance, row 535 may indicate a general routing preference for the service provider B 215. Row 540, on the other hand, may indicate a first routing preference, such as a business class VOIP call service. Further, row 545 may indicate a second routing preference, such as a residential VOIP call service.

The BGCF 130 may ignore "blank" factors in the service provider determination table. In some examples, blank factors may be attributed to the BGCF 130 not being able to determine the ingress trunk name, the calling party domain name, and/or the organization header value from the VOIP call request for certain service providers. For example, the service provider D 225 might not insert a calling party domain name and/or an organization header in their SIP invite message. When analyzing the SIP invite message from service provider D VOIP calls, the BGCF 130 might not be able to determine these factors. Additionally, and/or alternatively, in some examples, the BGCF 130 may determine the ingress trunk name, the calling party domain name, and/or the organization header of the VOIP call request does not match any ingress trunk name, calling party domain name, and/or organization header from the service provider determination table. For example, the internal service provider 205 may use multiple ingress trunk names, calling party domain names, and/or organization headers. Therefore, referring to row 510 of FIG. 3, the internal service provider 205 might not include any of these factors in the determination table. In instances where the BGCF 130 does not match any of the VOIP factors to the factors in the determination table, the BGCF 130 may determine that the internal service provider 205 may be servicing the VOIP call.

At step 435, the BGCF 130 may determine the service provider servicing the VOIP call and the routing preference for the VOIP call. For example, based on the comparison at step 430, the BGCF 130 may determine the service provider and/or the routing preference for the VOIP call.

At step 440, the BGCF 130 may determine the VOIP call type. As mentioned previously, service providers may provide routing behaviors for different call types. For example, some service providers may block VOIP calls to certain countries, but permit VOIP calls to other countries. Additionally, and/or alternatively, service providers may include a routing behavior to route help desk calls to their own service provider help desk. Further, a service provider may seek to route their VOIP calls to their own session border controllers and/or other servers, which may process and/or handle the VOIP calls for their subscribers. The BGCF 130 may determine the VOIP call type from the VOIP request, such as the SIP invite message. The VOIP call type may be a local VOIP call, a long distance VOIP call, an international VOIP call, a help desk VOIP call, a residential VOIP call, a business class VOIP call, an emergency VOIP call, a 1-800 VOIP call, or other types of VOIP and/or traditional calls.

The BGCF 130, at steps 445 through 470, may determine the routing behavior for the VOIP call request using a routing preference database, such as a routing preference database shown in FIG. 5.

Figure 4:
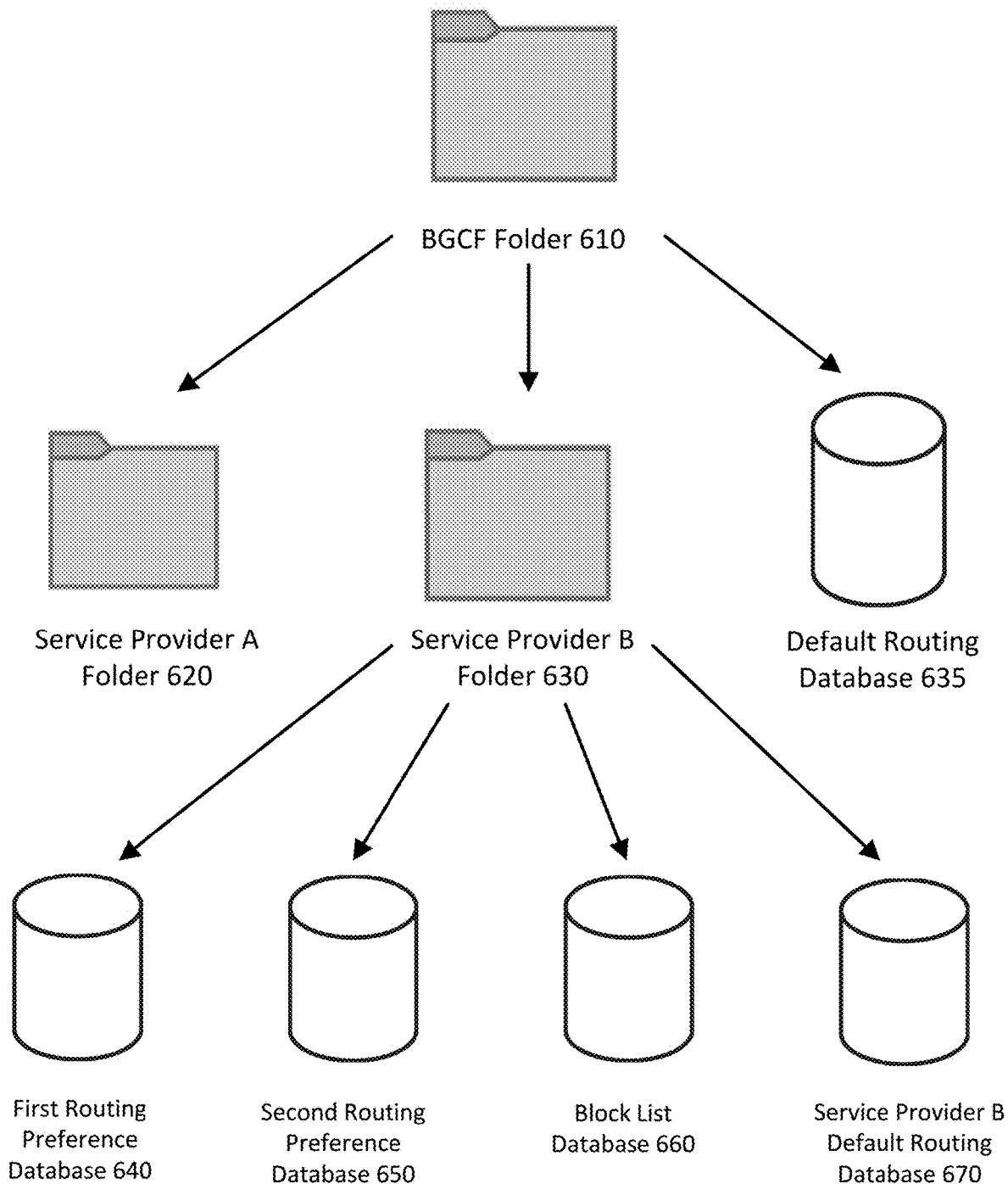
FIG. 4 shows an example routing directory according to one or more aspects described herein.

At step 445, the BGCF 130 may determine whether the service provider is in the routing directory. The routing directory may be a directory that stores folders comprising routing preference databases for different service providers. FIG. 4 shows an example routing directory stored in the BGCF 130. In the routing directory, the BGCF 130 may store one or more folders, such as a BGCF folder 610. Although the routing directory may be illustrated as file folders in FIG. 4, in some examples, the routing directory may include files, databases, and the like. Inside the BGCF folder 610, the BGCF 130 may store additional folders, such as a service provider A folder 620 and a service provider B folder 630. Additionally, the BGCF 130 may store one or more routing databases, such as a default routing preference database 635. In some examples, the internal service provider 205 may store their routing preferences in the default routing preference database 635.

When external service providers join, they may add their own routing preferences, such as routing preferences that are different from the default routing preferences. For example, when the service provider B 215 joins the VOIP infrastructure 100, the BGCF 130 may add a folder in the routing directory, such as the service provider B folder 630. Inside the service provider B folder 630, the BGCF 130 may store one or more additional routing preference databases for the service provider B 215, such as a first routing preference database 640, a second routing preference database 650, a block list database 660, and/or a service provider B default routing database 670. The service provider B default routing database 670 may indicate different routing preferences from the default routing preferences. For service provider B's 215 subscribers, the service provider B routing preference database 670 may supersede or take precedent over the default routing preference database 635. Thus, when the BGCF 130 receives a VOIP call request from a subscriber of the service provider B 215, the BGCF 130 may search for the call type in the service provider B routing preference database 670 rather than the default routing preference database. The first routing preference database 640, the second routing preference database 650, and the block list database 660 are explained in further detail in the steps below.

Returning back to FIG. 2, if the service provider, such as the service provider B 215, is in the routing directory, the method may move to step 450. At step 450, the BGCF 130 may determine whether the routing preference is in the routing directory. As mentioned previously, a service provider may provide different services or routing preferences depending on the subscriber. Referring to FIG. 3, rows 535 through 550 may indicate different routing preferences for the service provider B 215. For example, row 535 may indicate a general routing preference for the service provider B 215. Rows 540 and 545 may indicate a first routing preference for the service provider B 215, such as for a business class routing preference. Further, row 550 may indicate a second routing preference for the service provider B 215, such as a residential routing preference.

Now, referring to FIG. 4, the service provider B folder 630 may include the service provider B default routing database 670, the first routing preference database 640, and the second routing preference database 650. The first routing preference database 640 may indicate a first routing preference for the service provider B 215, and the second routing preference database 650 may indicate a second routing preference for the service provider B 215. Therefore, when the BGCF 130 determines the factors in row 535 for the VOIP call request (e.g., general routing preference), the BGCF 130 may search for the call type in the service provider B default routing database 670. However, when the BGCF 130 determines the factors in row 540 or 545 (e.g., first routing preference), the BGCF 130 may search for the call type in the first routing preference database 640. And, when the BGCF 130 determines the factors in row 550, the BGCF 130 may search for the call type in the second routing preference database 650.

If the routing preference for the service provider, such as the first routing preference for the service provider B 215, is in the routing directory, the method may move to step 455. At step 455, the BGCF 130 may determine whether the VOIP call type is in the routing preference database. FIG. 5 shows an example routing preference database. For example, FIG. 5 provides an example of the service provider B first routing preference database 640. When the BGCF 130 identifies the factors in rows 540 and/or 545 of FIG. 3, the BGCF 130 may use the first routing preference database 640 shown in FIG. 5 to determine the routing type. For instance, depending on the identified VOIP call type at step 440, the BGCF 130 may search the routing preference database for the identified VOIP call behavior.

If the BGCF 130 finds the identified VOIP call type in the routing preference database, the BGCF 130 may move to step 475. For instance, in some examples, the identified VOIP call type may be a help desk call. Referring to FIG. 5, the BGCF 130 may find the help desk call in row 720 of the routing preference database, and row 720 may indicate that the routing behavior is to route the VOIP call to the service provider B help desk. At step 475, the BGCF 130 may process the VOIP call according to the call type. For example, the BGCF 130 may route the call as appropriate based on the call preference in the routing database, such as routing the help desk VOIP call to the service provider B help desk. The method 400 may end.

If the BGCF 130 does not find the identified VOIP call type in the routing preference database, such as a 1-800 VOIP call, the method 400 may move to step 460. Additionally, and/or alternatively, referring back to step 450, if the routing preference for the service provider is not in the routing directory, such as a third routing preference for the service provider B 215, the method may move to step 460. At step 460, the BGCF 130 may determine whether the VOIP call type is in the service provider database. The service provider database, as mentioned previously, may be a database in the routing directory, such as the service provider B default routing database 670. Further, the service provider database may be a general routing preference database for the service provider, such as the service provider A 210 or the service provider B 215. The service provider database may be similar to the database shown in FIG. 5. For example, the service provider database may indicate a VOIP call type and a routing behavior for the VOIP call type.

If the BGCF 130 finds the identified VOIP call type in the service provider database, the BGCF 130 may move to step 475. At step 475, as described above, the BGCF 130 may process the VOIP call. If the BGCF 130 does not find the identified VOIP call in the service provider database, the method 400 may move to step 465.

At step 465, the BGCF 130 may determine whether the call type is in the block list. For example, rather than determining a routing behavior from the default routing preference database 635, a service provider may seek to block some VOIP call types, such as international calls to Germany. Referring to FIG. 4, a service provider, such as the service provider B 215 may provide a block list database, such as the block list database 660 for the service provider B 215. The block list database 660 may include many VOIP call types that are blocked by the service provider. For instance, the service provider B 215 may seek to block international VOIP calls to Germany. The BGCF 130 might not find the call type in a routing preference database, such as the first routing preference database 640, and/or the service provider database, such as the service provider B default routing database 670. However, the BGCF 130 may find the call type, international VOIP call to Germany, in the block list database 660. Thus, rather than determining the routing behavior from the common database, the method 400 may move to step 475. At step 475, the BGCF 130 may process the VOIP call, such as by blocking the VOIP call.

If the BGCF 130 does not find the call type in the block list database 660, the method 400 may move to step 470. Additionally, and/or alternatively, referring back to step 445, if the service provider, such as the service provider C 220 or the service provider D 225, is not in the routing directory, the method may move to step 470. At step 470, the BGCF 130 may determine the routing behavior from the default routing preference database 635. For example, the BGCF 130 may search the default routing preference database 635. The default routing preference database 635 may be similar to the first routing preference database 680. For example, depending on the VOIP call type of the VOIP call identified at step 440, the BGCF 130 may determine the routing behavior for the VOIP call. The routing behavior may include a route that indicates servers, computing devices, and/or SBCs along a path from the BGCF 130 to the recipient user device.

At step 475, the BGCF 130 may process the VOIP call. For example, the BGCF 130 may block, route and/or forward the VOIP call request to the next server, computing device, and/or SBC on the route to the recipient user device. The method 400 may end. In some examples, the BGCF 130 may change one or more header values of the VOIP call request to indicate a route from the caller user device to the recipient user device. The recipient user device and the caller user device may receive the changed header values. And, the user devices may use the route indicated in the changed header values to communicate between each other.

Figure 6:
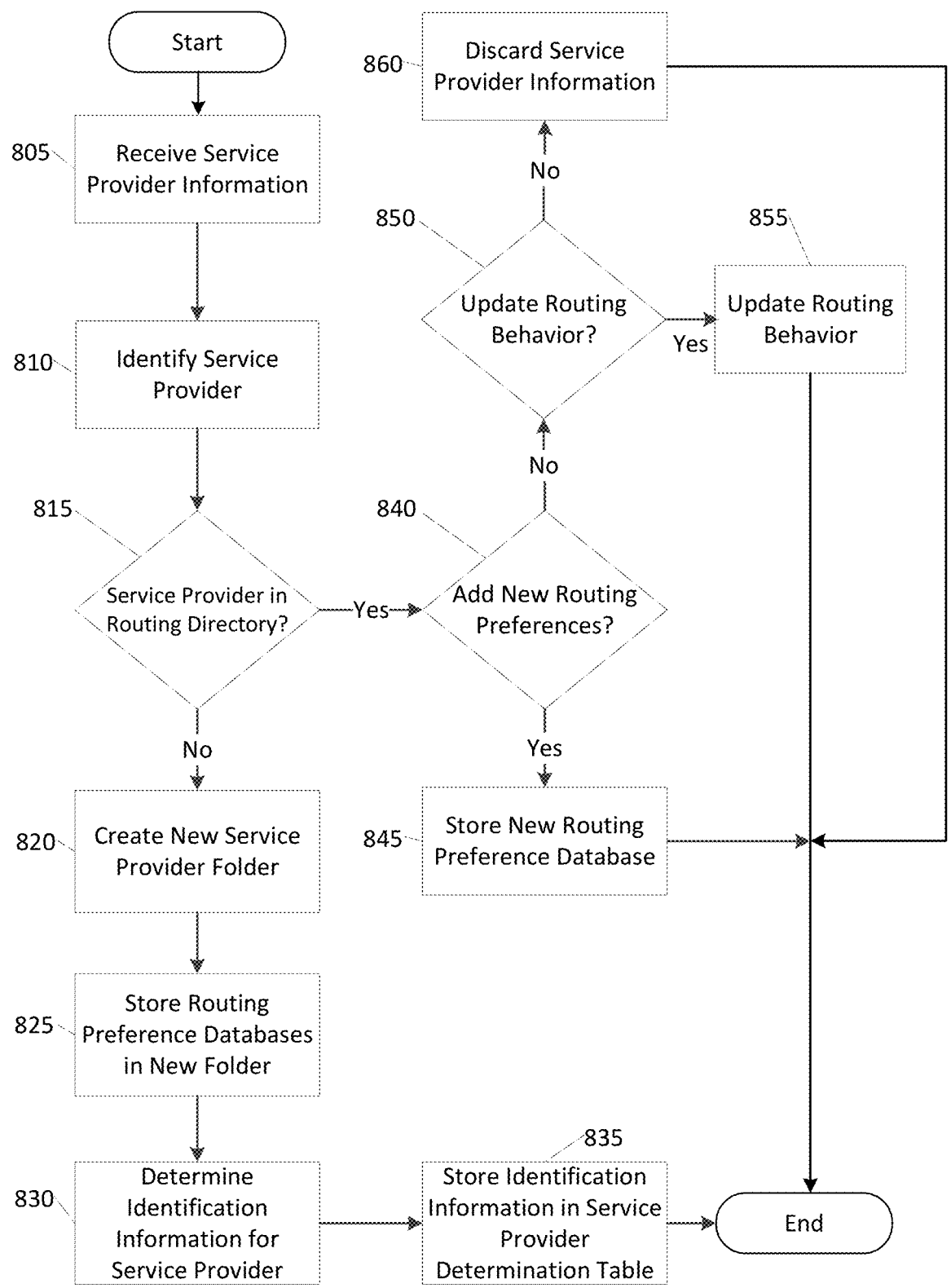
FIG. 6 shows an example method for adding service providers to a pre-existing voice over internet protocol infrastructure according to one or more aspects described herein.

FIG. 6 shows an example method for adding service providers to a pre-existing VOIP infrastructure. At step 805, a computing platform, such as the BGCF 130, may receive service provider information. For example, as mentioned previously, rather than building a VOIP infrastructure, a service provider, such as an external service provider, may join the existing VOIP infrastructure 100. The BGCF 130 may receive service provider information from an external service provider, such as the service provider C 220. The service provider information may indicate the service provider is seeking to join the VOIP infrastructure 100, routing preferences databases, routing behaviors, block lists, and/or service provider determination information. For instance, the service provider C 220 may seek to provide VOIP calling service to their subscribers. However, the service provider C 220 might not wish to build a VOIP infrastructure to support their VOIP service. Instead, the service provider C 220 may join the VOIP infrastructure 100.

At step 810, the BGCF 130 may identify the service provider from the service provider information. For example, based on the service provider information indicating an intention for the service provider C 220 to join the VOIP infrastructure 100, the BGCF 130 may identify the service provider as the service provider C 220.

At step 815, the BGCF 130 may determine whether the service provider is in the routing directory. Referring back to FIG. 4, the BGCF 130 may determine whether the service provider identified at step 810, such as the service provider C 220, is in the routing directory. For example, FIG. 4 shows a folder 620 for the service provider A 210 and a folder 630 for the service provider B 215. If the service provider, such as the service provider C 220, is not in the routing directory, the system may move to step 820.

At step 820, the BGCF 130 may create a new service provider folder in the routing directory. For example, the service provider information may indicate routing preferences for a service provider, such as routing preferences for the service provider C 220. The BGCF 130 may create a folder for the service provider C 220 in the routing directory. For instance, the BGCF 130 may create a folder, such as a service provider C folder, inside the BGCF folder 610.

At step 825, the BGCF 130 may store routing preference databases for the new service provider. For example, the service provider information may indicate routing preference databases for the service provider C 220. The routing preference databases may be similar to the example shown in FIG. 5. For example, the routing preference database may indicate a VOIP call type and a routing behavior for the VOIP call type. The service provider C 220 may provide a general routing preference and/or one or more routing preferences for their subscribers.

Now, referring to FIG. 4, in some examples, the service provider C 220 may provide one or more databases similar to the service provider B 215 routing preference databases. For example, the service provider C 220 may provide a default routing preference database, similar to the service provider B default routing database 670. Further, the service provider C 220 may also provide additional databases, such as routing preference databases for particular subscribers and/or block list databases.

At step 830, the BGCF 130 may determine identification information for the service provider. The identification information may include factors, such as the ingress trunk name, the calling party domain name, and/or the organization header, for the routing preferences of the new service provider. The BGCF 130 may determine the identification information from the service provider information.

At step 835, the BGCF 130 may store the identification information in the service provider determination table. For example, referring to FIG. 3, the BGCF 130 may store the identification information determined at step 830 in a new row of the service provider determination table. For instance, the BGCF 130 may store the identification information in row 560 of the service provider determination table and the method 800 may end.

Referring back to step 815, if the service provider is in the routing directory, the method 800 may move to step 840. At step 840, the BGCF 130 may determine whether the service provider is adding a new routing preference database. For example, an existing service provider may seek to add a new routing preference database. In some examples, the service provider A 210 may begin to offer a business class VOIP service to their subscribers. Thus, referring to FIG. 4, the service provider A 210 may keep a general routing preference database in the service provider A folder 620. But, the service provider A 210 may add a new routing preference database, such as a first routing preference database, in the service provider A folder 620. Further, in some examples, the service provider A 210 may seek to block certain types of VOIP calls, such as international VOIP calls. The service provider A 210 may add a routing preference database, such as a new block list database, in the service provider A folder 620.

If the BGCF 130 determines the service provider is adding a new routing preference at step 840, the method 800 may move to step 845. At step 845, the BGCF 130 may store the new routing preference database to the routing directory and the method 800 may end.

If the BGCF 130 determines the service provider is not adding a new routing preference at step 840, the method 800 may move to step 850. At step 850, the BGCF 130 may determine whether to update the routing behavior. For example, an existing service provider may seek to update a routing behavior for a VOIP call type in a routing preference. In some examples, the service provider A 210 may add, change, and/or remove one or more routing behaviors for the VOIP call types.

If the BGCF 130 determines to update the routing behavior, the method 800 may move to step 855. At step 855, the BGCF 130 may update the routing behavior. For example, the BGCF 130 may determine updated routing behaviors for the VOIP call types from the service provider information. The BGCF 130 may update the routing behaviors and/or the call types in the routing preference databases and the method 800 may end.

However, if the BGCF 130 determines not to update the routing behavior, the method 800 may move to step 860. At step 860, the BGCF 130 may discard the service provider information and the method 800 may end.

The BGCF 130 may use the service provider information when it receives another VOIP call request. For example, referring back to FIG. 2, the BGCF 130 may use the new identification information stored in the service provider determination table at step 835 to determine the service provider and/or the routing preference as described at steps 410 through 435 of FIG. 2. Additionally, the BGCF 130 may use the new stored routing preference databases at step 825, the new routing preference database at step 845, the new updated routing behavior at step 855, to process and/or route the VOIP call as described at steps 445 through 475 of FIG. 2.

Figure 7:
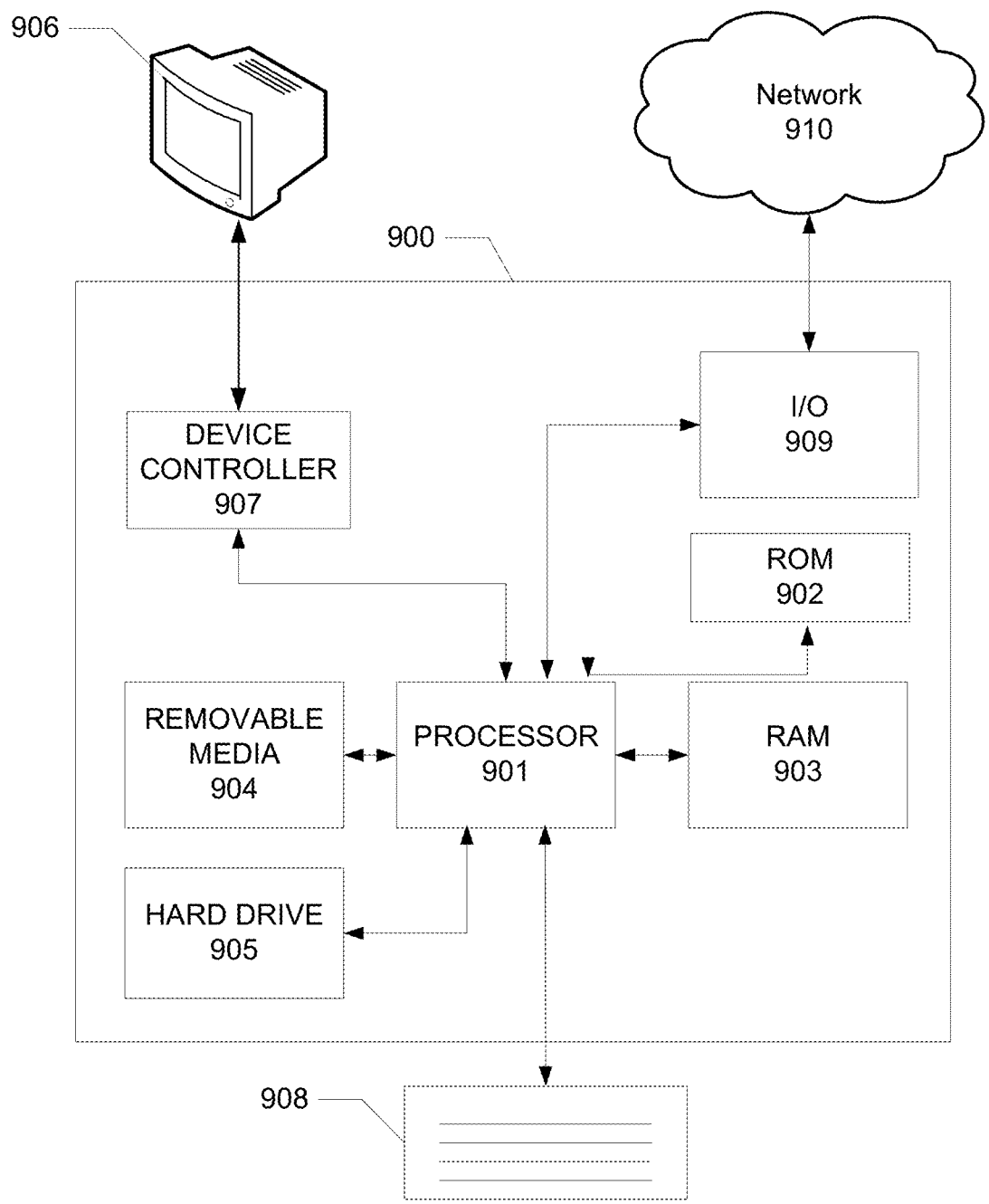
FIG. 7 shows an example computing device that may be used to implement one or more aspects described herein.

FIG. 7 shows an example computing device that may be used to implement any of the methods described above. A computing device 900 may include one or more processors 901, which may execute instructions of a computer program to perform any of the features described herein. The instructions may be stored in any type of computer-readable medium or memory, to configure the operation of the processor 901. For example, instructions may be stored in a read-only memory (ROM) 902, a random access memory (RAM) 903, a removable media 904, such as a Universal Serial Bus (USB) drive, a compact disk (CD) or a digital versatile disk (DVD), a floppy disk drive, or any other desired storage medium. The storage medium may comprise a plurality of sectors, wherein a size of each sector of the plurality of sectors is approximately a multiple of a substantially fixed fragment size. Instructions may also be stored in an attached, or internal, hard drive 905. The computing device 900 may include one or more output devices, such as a display 906, for example, an external television, and may include one or more output device controllers 907, such as a video processor. There may also be one or more user input devices 908, such as a remote control, keyboard, mouse, touch screen, microphone, etc. The computing device 900 may also include one or more network interfaces, such as a network input/output (I/O) circuit 909, for example, a network card, to communicate with an external network 910. The network I/O circuit 909 may be a wired interface, a wireless interface, or a combination of the two. The network I/O circuit 909 may include a modem, such as a cable modem, and the external network 910 may include the communication links, an external network, an in-home network, a provider's wireless, coaxial, fiber, or hybrid fiber/coaxial distribution system, such as a DOCSIS network, or any other desired network.

FIG. 7 shows a hardware configuration of the device 900, but it should be understood that some or all of the illustrated components may be implemented as software. Modifications may be made to add, to remove, to combine, or to divide components of the computing device 900 as desired. Additionally, the components illustrated may be implemented using basic computing devices and components, and the same components (e.g., a processor 901, a ROM storage 902, a display 906, etc.) may be used to implement any of the other computing devices and components described herein. For example, the various components herein may be implemented using computing devices having components such as a processor executing computer-executable instructions stored on a computer-readable medium, as illustrated in FIG. 7. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although examples are described above, the various features and steps may be combined, divided, omitted, rearranged, revised, or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
receiving, by a first computing device, a request to route a voice over internet protocol (VOIP) call, wherein the request comprises a session initiation protocol (SIP) invite message;
determining, based on information within the SIP invite message, a first indicator indicative of a plurality of service providers;
determining, based on the first indicator and a second indicator within the SIP invite message, a first service provider from the plurality of service providers;
determining, based on the first service provider, a routing rule of a plurality of routing rules, wherein the plurality of routing rules comprises the routing rule and at least a second routing rule associated with a second service provider that shares a VOIP infrastructure with the first service provider; and
routing, based on the routing rule, the VOIP call.

2. The method of claim 1, wherein the determining a routing rule is further based on a third indicator, wherein the first indicator and second indicator indicate a plurality of routing rules corresponding to the first service provider.

3. The method of claim 1, wherein the first indicator comprises an ingress trunk name, a calling party domain name, or an organization header value.

4. The method of claim 1, wherein the first indicator comprises an ingress trunk name and the second indicator comprises an organization header value or a calling party domain name.

5. The method of claim 1,
wherein the first indicator together with the second indicator indicate the routing rule.

6. The method of claim 1, further comprising:
receiving a routing preference database from the first service provider, wherein the routing preference database indicates a plurality of routing rules for a plurality of call types; and
storing the routing preference database,
wherein the determining the routing rule is based on the routing preference database.

7. The method of claim 1, further comprising:
determining, based on the SIP invite message, a call type of the VOIP call,
wherein the determining the routing rule is based on the call type of the VOIP call.

8. The method of claim 1, further comprising:
determining, based on the SIP invite message, that the VOIP call is an international VOIP call to an international destination, wherein the routing rule indicates the international destination is blocked by the first service provider; and
blocking, based on the routing rule, the international VOIP call.

9. A method comprising:
storing, by a computing device and in a routing directory, a first routing preference database corresponding to a first service provider;
receiving, from a second service provider, a request to join a voice over internet protocol (VOIP) infrastructure corresponding to the first service provider;
determining, based on the request, a first indicator indicative of a plurality of service providers, wherein the plurality of service providers comprise the first service provider and the second service provider;
selecting, based on a determination that the first indicator together with a second indicator indicate the second service provider, a second routing preference database corresponding to the second service provider; and
routing, based on the second routing preference database, a VOIP call.

10. The method of claim 9, wherein the first service provider uses an IP multimedia subsystem (IMS) framework, and wherein the second service provider uses a non-IMS framework.

11. The method of claim 9, wherein the first indicator comprises an ingress trunk name, a calling party domain name, or an organization header.

12. The method of claim 9, further comprising:
receiving, from the second service provider, a third routing preference database corresponding to the second service provider, wherein the third routing preference database indicates a plurality of blocked VOIP call types; and
storing, in the routing directory, the third routing preference database corresponding to the second service provider,
wherein the selecting the second routing preference database to route the VOIP call is further based on the third routing preference database.

13. The method of claim 9, wherein the first routing preference database indicates a first routing rule for a VOIP call type, wherein the second routing preference database indicates a second routing rule for the VOIP call type, and wherein the method further comprises:
determining that a request to route the VOIP call indicates the second service provider,
wherein the selecting the second routing preference database comprises selecting the second routing preference database based on the second service provider, and wherein the routing the VOIP call comprises routing the VOIP call based on the second routing rule.

14. The method of claim 9, further comprising:
receiving, from the second service provider, an updated routing rule corresponding to the second routing preference database; and
changing a routing rule in the second routing preference database to the updated routing rule.

15. A method comprising:
receiving, by a first computing device, a data packet indicating a request to route a VOIP call;
determining, based on a first indicator and a second indicator within the data packet, a first service provider, wherein the first indicator indicates a plurality of service providers and wherein the second indicator, together with the first indicator, indicates the first service provider; and
routing, based on the determining the first service provider, the VOIP call.

16. The method of claim 15, wherein the first indicator indicates a first session border controller corresponding to the first service provider, and wherein determining the first service provider comprises determining, based on an identification of the first session border controller, the first service provider.

17. The method of claim 16, wherein the second indicator comprises an ingress trunk name, wherein the routing is further based on a routing rule indicated by the first indicator and the second indicator.

18. The method of claim 15, wherein the first indicator comprises a first calling party domain name, an ingress trunk name, or an organization header value.

19. The method of claim 15, wherein the second indicator comprises a first organization header.

20. The method of claim 15, further comprising:
storing a plurality of entries in a service provider determination table;
receiving a request comprising a new service provider identifier; and
updating the service provider determination table to comprise a new entry indicating the new service provider identifier,
wherein the determining the first service provider is based on comparing the first indicator and the second indicator with the service provider determination table.

* * * * *

UNITED STATES PATENT AND TRADEMARK OFFICE
CERTIFICATE OF CORRECTION

| | | |
|---|---|---|
| PATENT NO. | : 10,944,873 B2 | Page 1 of 1 |
| APPLICATION NO. | : 15/783766 | |
| DATED | : March 9, 2021 | |
| INVENTOR(S) | : Li et al. | |

It is certified that error appears in the above-identified patent and that said Letters Patent is hereby corrected as shown below:

On the Title Page

Column 1, (73) Assignee, Line 2:
Delete "FFC," and insert --LLC,-- therefor

In the Specification

Column 9, Detailed Description, Lines 36-37:
Delete "routing preference" and insert --default routing-- therefor Column 9, Detailed Description, Line 41:
Delete "routing preference" and insert --default routing-- therefor Column 11, Detailed Description, Line 29:
Delete "680." and insert --640.-- therefor Signed and Sealed this
Twenty-first Day of January, 2025

Coke Morgan Stewart
*Acting Director of the United States Patent and Trademark Office*